(12) United States Patent
Desnijder et al.

(10) Patent No.: US 7,472,532 B2
(45) Date of Patent: Jan. 6, 2009

(54) METAL DETECTOR ARRANGEMENT

(75) Inventors: Dirk Johan Desnijder, Wondelgem (BE); Johan Julien Leo Doom, Ledegem (BE); Ward Marc Renaat Byttebier, Zwevegem (BE)

(73) Assignee: CNH America LLC, New Holland, PA (US)

( * ) Notice: Subject to any disclaimer, the term of this patent is extended or adjusted under 35 U.S.C. 154(b) by 146 days.

(21) Appl. No.: 11/517,876

(22) Filed: Sep. 8, 2006

(65) Prior Publication Data

US 2007/0056257 A1 Mar. 15, 2007

(51) Int. Cl.
*G01V 3/08* (2006.01)
(52) U.S. Cl. .................................... 56/10.2 J
(58) Field of Classification Search .............. 56/10.2 R, 56/10.2 J, DIG. 15; 460/1–3; 324/251, 252, 324/260, 261, 262, 235, 239–243
See application file for complete search history.

(56) References Cited

U.S. PATENT DOCUMENTS

| | | | |
|---|---|---|---|
| 4,433,528 A | 2/1984 | Bohman | |
| 4,788,813 A * | 12/1988 | Strosser et al. | 56/10.2 J |
| 5,343,676 A | 9/1994 | Weiss | |
| 5,444,966 A * | 8/1995 | Strosser et al. | 56/10.2 J |
| 5,504,428 A | 4/1996 | Johnson | |
| 6,105,347 A * | 8/2000 | Behnke | 56/10.2 J |
| 6,252,397 B1 * | 6/2001 | Behnke et al. | 324/232 |
| 7,064,540 B2 * | 6/2006 | Brune et al. | 324/232 |

* cited by examiner

*Primary Examiner*—Thomas B Will
*Assistant Examiner*—Mai T Nguyen
(74) *Attorney, Agent, or Firm*—Michael G. Harms; John William Stader; Patrick M. Sheldrake

(57) ABSTRACT

A forage harvester comprises a feeder for feeding harvested crop material to the processing mechanism along a crop feed path It is equipped with a foreign object detector for signaling the presence of foreign objects in said harvested crop. The detector comprises a sensor having a detection field extending into at least a portion of said path. The sensor is substantially symmetric with respect to a direction transverse to the crop feed path and the detector further comprises a restriction system distinct from said sensor, making said detection field asymmetric with respect to said transverse direction. As a result, the detector becomes less sensitive to noise caused by the other components of the harvester.

10 Claims, 3 Drawing Sheets

METAL DETECTOR ARRANGEMENT

FIELD OF THE INVENTION

The present invention relates generally to agricultural harvesting machines comprising a foreign object detector in the feeder section for signaling the presence of a foreign object in the crop fed into the machine. More particularly, it relates to an improved foreign object detector arrangement, which reduces the occurrence of false metal detections caused by movements or vibrations of metal components adjacent the detector.

BACKGROUND OF THE INVENTION

It is well known in the art to provide agricultural harvesting machines, such as forage harvesters, with an apparatus for detecting foreign material in the stream of crop material which is being fed to a crop processing unit, such as a rotating cutterhead cooperating with a stationary shearbar. Such apparatus may comprise a metal detector sensor as described in U.S. Pat. No. 4,433,528. The signal generated by this sensor is fed to feeder arrest means, which provoke an immediate stop of the means feeding the crop material to the cutterhead. Thus is prevented that stray metal objects, which were picked up from the field, reach the cutterhead and cause serious damage to the knives and the shear bar. Portions of damaged knives might even get detached and cause even worse damage to other sections of the crop processing unit or the rest of the harvester. Small metal parts would be comminuted by the knives and mixed with the crop. When ingested by cattle, they cause serious harm to the stomachs and intestines and even cause death of the animal. The use of a foreign object detector and quick stop apparatus prevents such injuries.

Most metal detector sensors comprise a plurality a magnets providing magnetic flux lines extending into the crop feed path. Changes to the magnetic field are sensed by coils or Hall effect sensors which are arranged in the magnetic field, usually adjacent the magnets. The sensor may have an array of permanent magnets, some of which having a north pole and others a south pole extending towards the crop, as described in U.S. Pat. Nos. 4,433,528 and 5,343,676. Herein most flux lines flow from the one magnet to the other. In this manner the detection field is limited substantially to the area above the magnets. However, the sensitivity of the sensor decreases quickly with the vertical distance from the magnets, as the flux lines become less dense. As a result a small foreign object in the upper layer of the crop may pass undetected and reach the cutterhead.

A higher detection field can be realised by using magnets that all have the same polarity, as in U.S. Pat. No. 5,504,428 and DE-A-199 12 407. Such sensors are capable of detecting foreign objects in the top layers of the crop flow. However, it has been experienced that they also are less reliable because they frequently generate false detection signals in response to vibrations or movements of components of the harvester. For instance ferrous rollers or augers rotating in the vicinity of the sensor cause a substantial magnetic noise, which may include peak values exceeding the threshold value for triggering the quick stop apparatus. The operator may react to frequent false detections by raising the threshold value. As a result the sensor arrangement also becomes less sensitive to genuine signals caused by stray metal in the crop.

Hence, there is a need for a detector apparatus that is sufficiently sensitive to the presence of foreign objects in the crop flow, but is not lightly disturbed by the surrounding components of the harvester.

SUMMARY OF THE INVENTION

According to the invention there is provided an agricultural harvesting machine comprising a means for processing harvested crop material, a feeder means for feeding harvested crop material to the processing means along a crop feed path and a foreign object detector means for signaling the presence of foreign objects in the harvested crop, the detector means comprising a sensor having a detection field transverse to the crop feed path and extending into at least a portion of the path, characterised in that the sensor is substantially symmetric with respect to a direction transverse to the crop feed path and the detector means further comprises a restriction means distinct from the sensor, making the detection field asymmetric with respect to the transverse direction.

This arrangement makes it possible to use a straightforward type of sensor, which produces a sufficiently great detection field, while shielding the moving components of the harvester from the sensor, such that their noise does not reach the sensor.

Advantageously, the restriction means are operable to restrict the detection field in the crop feed path rearward of the sensor. This is of particular interest when the sensor is installed at the entrance of the harvester and most moving components lie behind the sensor.

The sensor may be installed inside a hollow feeder roll, also named feedroll, of the feeder means. In case the sensor is installed in a roll below the crop feed path, the detection field as generated by the sensor and restricted by the restriction means preferably extends substantially above and forward of the feeder roll. In case the sensor is installed in a roll above the crop feed path, the detection field should rather extend substantially below and forward of this feeder roll.

In case the sensor is a magnetic field sensor comprising at least one magnet, the detection field may be restricted by a ferromagnetic plate extending rearwardly from the sensor. The plate may be mounted adjacent to the sensor on the upper or lower side, opposite to the crop flow path. Both the sensor and the restriction plate may be installed within a feeder roll, which has a wall of non-ferromagnetic material. The sensor and the ferromagnetic plate may be mounted above and to a shaft portion of this feeder roll.

The restricting plate may end short of the inner surface of the wall of the feedroll to provide maximum shielding of the noise from the rearward components. The plate may be angled, in the direction of the crop flow to provide further shielding.

Expansion of the detection field by the mounting of the sensor to ferrous machine components may be contained by using non-ferromagnetic mounting means. For instance one can use non-ferromagnetic bolts and/or spacers. These may be made out of austenitic stainless steel, aluminium or other appropriate material.

BRIEF DESCRIPTION OF THE DRAWINGS

An embodiment of the present invention will now be described in further detail, by way of example only, with reference to the accompanying drawings, in which.

DETAILED DESCRIPTION OF THE PREFERRED EMBODIMENT

The terms "front", "rear", "forward", "rearward", "right" and "left" used throughout this specification are determined with respect to the normal direction of movement of the machine in operation. However they are not to be construed as limiting terms.

Figure 1:
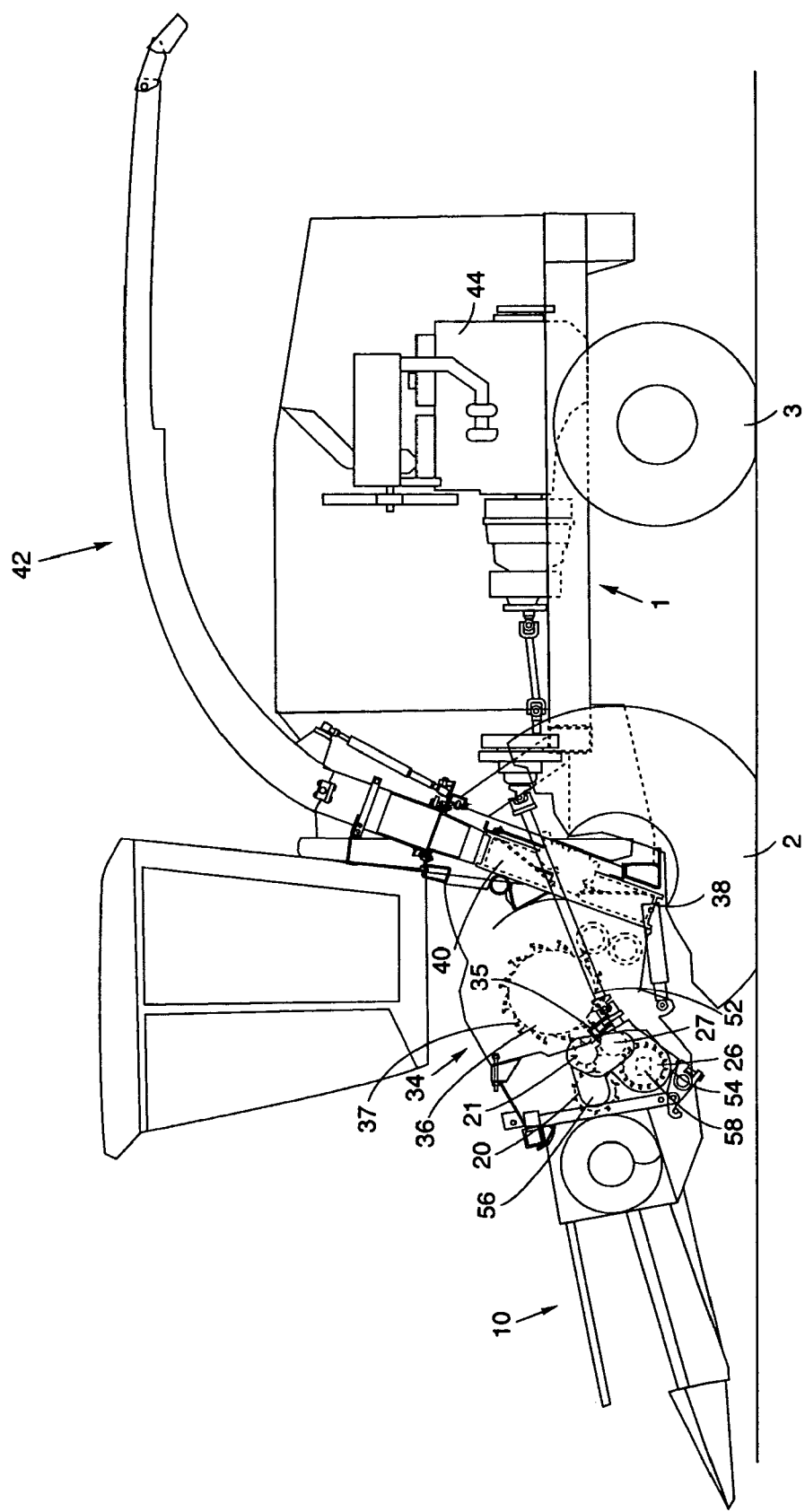
FIG. 1 is a schematic, side elevation view of a forage harvester, comprising a feed roll equipped with a sensor of a foreign object detector.

In FIG. 1, there is shown a forage harvester having a main frame 1 on which there are mounted ground engaging traction wheels 2 and steering wheels 3. The forage harvester shown is equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. The row crop attachment 10 harvests maize stalks from the field and delivers the crop material to the bite of feeder means installed in a front unit of the forage harvester.

Said feeder means comprise lower feeder means, including a forward lower feedroll 26, and a smooth, rear lower feedroll 27, and upper feeder means, including an forward upper feedroll 20 and an rear upper feedroll 21. Said upper and lower feeder means rotate to convey the crop material along a crop feed path in between to a cutterhead 36, which is mounted within a cutterhead frame 34 and comprises a plurality of knives 37, generating a cylindrical peripheral shape or profile, when the cutterhead 36 is rotated.

During normal harvesting operation, when the cutterhead 36 is rotated in its normal operation sense, as indicated by arrow F in FIG. 1, the knives 37 cooperate with a fixed shearbar 35 (FIGS. 4 and 5) to cut the crop material to length and to project it into a blower housing 38 which is provided with a blower rotor 40. This rotor 40 comprises a plurality of paddles, which throw the material upwardly through a blower outlet into a discharge spout 42, which can be positioned by an operator in the cab 43 to direct the cut crop material as required, normally into a wagon which is moving alongside or behind the forage harvester.

The forage harvester has a power plant or engine 44, which is drivingly connected to a drive shaft 52, providing motive power to a lower feedroll transmission 54 on the left hand side of the front unit. This transmission 54 is connected directly to the lower feedrolls 26, 27 and through a drive shaft (not shown) to the upper feedroll transmission 56, drivingly interconnecting the upper feedrolls 21, 20.

The forage harvester is equipped with apparatus for detecting the presence of foreign bodies in the crop material flowing to the rotating cutterhead 36. The present apparatus 58 comprises a sensor 60 installed within the forward lower feedroll 26 as shown in FIG. 1. Alternatively, the sensor may be installed at any other convenient place along the path of the crop material to the cutterhead 36. The detecting apparatus 58 illustrated is a metal detector, comprising a set of magnets 62 generating a magnetic field extending into the crop flow path and means (not shown) for sensing changes to this magnetic field, as caused by stray ferro-magnetic objects in the crop flow. These sensing means may comprise coils around and/or between the magnets or Hall effect sensors above the magnet.

The arrival of a ferro-magnetic object in the detection field causes a disturbance of the magnetic field which is captured by the sensing means of the sensor 60. The latter then generates a signal to a microprocessor of the detection apparatus 58 to actuate a quick stop apparatus which is mounted to the drive line to the feedrolls 20, 21, 26, 27 such quick stop apparatus may be of the type described in EP-A-0 821 871, but the invention may also be used with other quick stop apparatus, operable to instantly arrest the feeder means. In this manner, the apparatus halts the crop flow before the object can reach the shearbar 35 and the rotating cutterhead 36. It thereby prevents serious damage to the knives 37 and the shearbar 35. It also prevents that the cutterhead 36 chops the metal to small pieces which may ingested by the cattle together with the forage.

Figure 2:
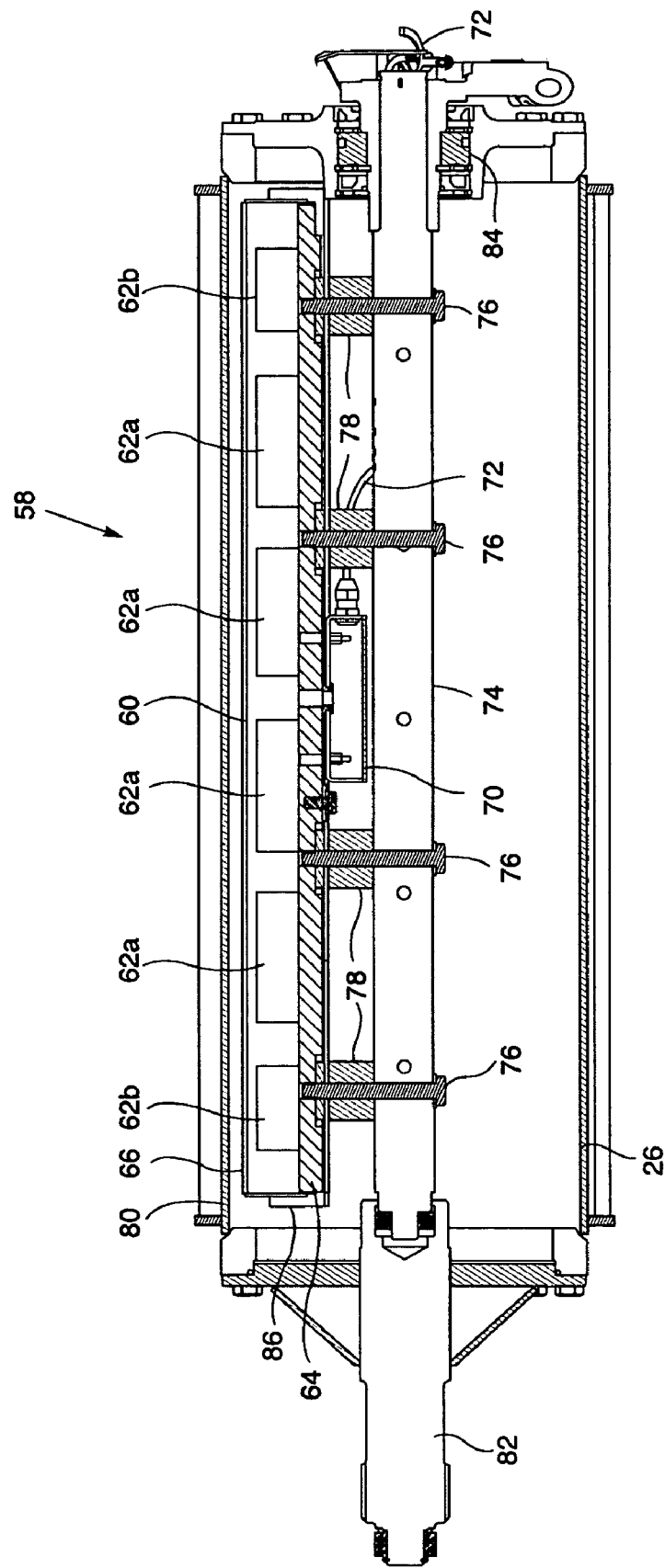
FIG. 2 is a sectional view of the feedroll and the sensor of FIG. 1.

As shown in FIG. 2, the sensor 60 comprises a base plate 64 made out of ferromagnetic steel, onto which is mounted a set of six magnets 62, all having a north pole at their upper ends. Alternatively, the upper ends may also be south poles. The magnetic flux lines depart substantially perpendicularly from the upper ends of the magnets 62 and curve forwardly and rearwardly to the area below the sensor 60. The four central magnets 62a are wider than the two outer magnets 62b for a more even magnetic field above the sensor 60. The sensor 60 has a cover 66 made out of non-ferromagnetic material, such as stainless steel. Sensing coils (not shown) are arranged adjacent the magnets and are connected to electronic circuitry comprising an amplifier and a filter, in a box 70 below the base plate 64. The circuitry generates a signal which is transmitted through wiring 72 to a microprocessor in the cab 43 of the harvester. The empty space between the cover 66 and the magnets 62 and coils may be filled with an appropriate passive filling material, such as polyurethane for improving the durability of the sensor 60 under the vibrations of operating harvester.

Figures 4, 5:
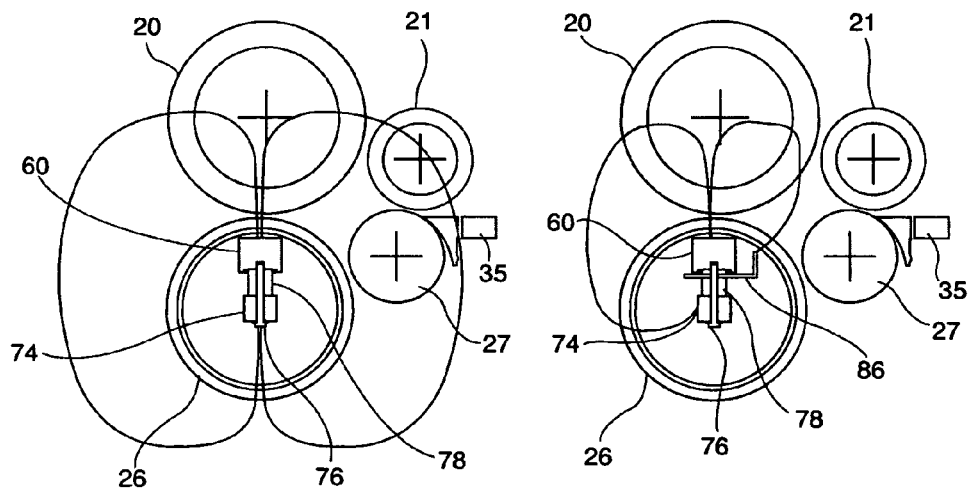
FIG. 4 is a schematic representation of the detection field of the sensor of FIG. 3 without the improvement of the present invention.
FIG. 5 is a schematic representation of the detection field of the sensor of FIG. 3 using the improvement of the present invention.

Because of the alignment of the magnets 62 on the base plate 64, their distribution over the full sensor 60 is substantially symmetric with respect to its longitudinal direction, i. e , the direction transverse to the crop flow. When removed from the harvester and in the absence of ferromagnetic materials, the sensor 60 produces a substantially symmetric magnetic field, extending as far forwardly as rearwardly. A cross section of the resulting field is schematically shown in FIG. 4.

The sensor 60 is mounted by four bolts 76 to a stationary shaft portion 74, which extends over almost the full width of the feedroll 26. Four bushings or spacers 78 hold the sensor 60 at a small distance from the cylindrical wall 80 of the feedroll. This wall is made out of non-ferromagnetic material, such as austenitic stainless steel. At one side the wall 80 is drivingly connected to a rotatable shaft portion 82 of the feedroll. On the other side, the wall is mounted via a ball or roller bearing 84 to the stationary shaft portion 74.

Figure 3:
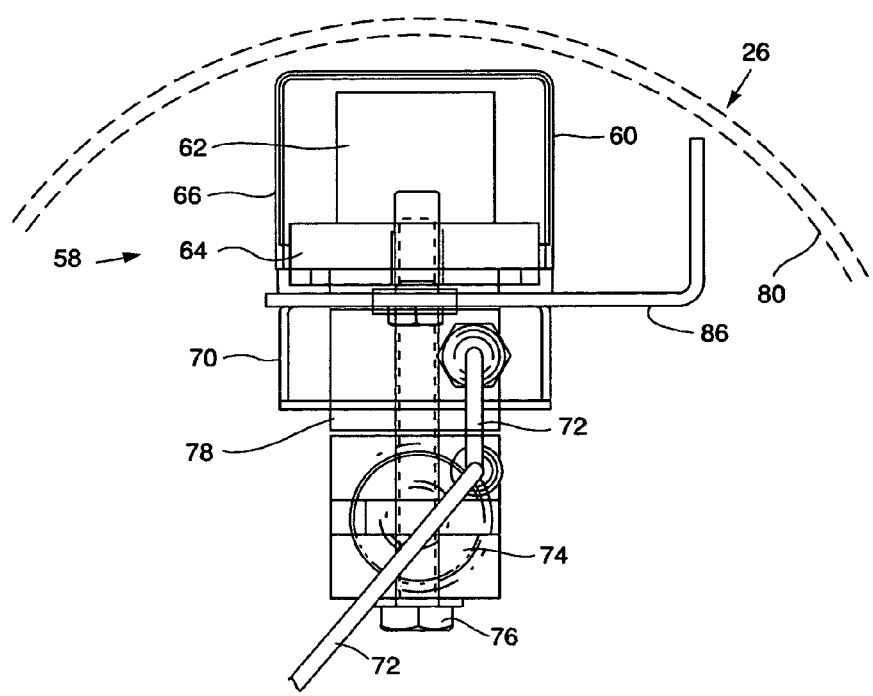
FIG. 3 is a cross sectional view of the feedroll and the sensor of FIG. 2.

As best shown in FIG. 3, a rearwardly extending plate 86 is mounted underneath the sensor 60 to the stationary shaft portion 74. It has an upwardly angled rear section which ends short of the inner surface of the feedroll wall 80. The plate 86 has a width that is slightly greater than the width of the sensor base plate 64. It is made out of ferromagnetic material, such that it captures the rearward flux lines from the magnets 62 and thereby contains the rearward portion of the magnetic field, as schematically shown in FIG. 5. The plate 86 may have a thickness of 3 to 5 mm Commonly, also the stationary shaft portion 74 is made out of ferromagnetic material. When the sensor 60 is mounted thereto by ferromagnetic bolts 76 and/or spacers 78, this shaft portion equally becomes magnetised, thereby extending the magnetic detection field downwards as schematically shown in FIG. 4. This effect may be advantageous when no metal machine components are moving through the detection field. However, the front field area may extend as far as the path of a rotating component, e.g. an auger, of the harvesting attachment 10, and the rear area may extend into the path of the knives of the cutterhead knives 37. These machine components will then cause a recurring noise in the detection apparatus signal.

The addition of the ferromagnetic plate 86 to the detection apparatus 58 already substantially reduced the rear and lower portion of the detection field, such that it keeps clear of the knife path. The front and rear portion of the detection field can be reduced by magnetically insulating the sensor 60 from the shaft portion 74. This may be realised by the use of bolts 76 and spacers 78 of non-ferromagnetic material. For instance, the bolts may be made of austenitic stainless steel and the spacers may be made out of aluminium The resulting magnetic detection field then generally takes the form shown in FIG. 5. The field still advantageously encompasses the portion of the crop flow path in front of and above the feedroll 26, but has been reduced substantially in the other areas. In this manner, the susceptibility of the sensor 60 to noise from moving components of the feeder means and the harvesting attachment 10 is reduced dramatically.

The resulting signal from the sensor 60 contains a substantially smaller amount of noise. This is particularly advantageous, where the detection apparatus 58 comprises means, e.g. software, that automatically adapt the threshold level at which the quick stop apparatus is triggered, to the average level of the noise signal. Such system is described in EP-A-0. 735. 384. In the present arrangement, the use of the plate 86 reduces the noise signals, and the genuine signals caused by stray metal become more distinguishable, such that the overall performance of the detection apparatus is increased.

It will be appreciated that an arrangement according to the invention retains the effectiveness of the sensor in the area above the magnets 60, while reducing or eliminating the influence of machine components in the area behind and below the feedroll 26.

Although the invention has been described with reference to a particular embodiment, it will be appreciated that the scope of the invention, as defined by the claims, is not limited thereto. Other embodiments falling within this scope may come to the mind of the skilled person. For instance, the plate extending rearwardly from the sensor need not be angled but may be straight. The sensor is shown in an upright position, but it may also be installed at an angle to the vertical such that a greater portion of the detection field extends in the area forward of the feedroll. It is also conceivable to provide the ferromagnetic plate with upright side sections on the left and right hand sides of the sensor. The upright walls shield the detection field from the noise of components outward of the feedroll.

The invention claimed is:

1. An agricultural harvesting machine comprising:
   means for processing harvested crop material;
   feeder means for feeding harvested crop material to said processing means along a crop feed path; wherein said feeder means includes at least one feeder roll having a substantially cylindrical wall made out of non-ferromagnetic material;
   foreign object detector means for signaling the presence of foreign objects in said harvested crop, said detector means comprising a sensor having a detection field transverse to said crop feed path and extending into at least a portion of said path, wherein said sensor includes at least one magnet, wherein said detection field is a magnetic field, wherein said sensor is substantially symmetric with respect to a direction transverse to said crop feed path;
   said detector means further includes restriction means distinct from said sensor, making said detection field asymmetric with respect to said transverse direction, wherein said restriction means comprise a ferromagnetic plate extending rearwardly from said sensor, and further wherein said sensor and said ferromagnetic plate are installed within said wall.

2. An agricultural harvesting machine according to claim 1, characterised in that said restriction means comprise means restricting the detection field in the crop feed path rearward of said sensor 3. An agricultural harvesting machine according to claim 1, characterised in that:
   said feeder means comprise at least one hollow feeder roll;
   said sensor is installed inside said hollow feeder roll;
   said detection field substantially extends above and forward of said feeder roll; and
   said restriction means restrict the detection field rearward of said feeder roll.

4. An agricultural harvesting machine according to claim 1, characterised in that in that said sensor comprises a set of magnets which all have the same polarity.

5. An agricultural harvesting machine according to claim 1, characterised in that said ferromagnetic plate is mounted adjacent said sensor on a side opposite to said crop feed path.

6. An agricultural harvesting machine according to claim 1, characterised in that said sensor and said ferromagnetic plate are mounted to a shaft portion of said at least one feeder roll.

7. An agricultural harvesting machine according to claim 1, characterised in that said ferromagnetic plate ends short of an inner surface of said wall.

8. An agricultural harvesting machine according to claim 1, characterised in that said ferromagnetic plate is angled.

9. An agricultural harvesting machine according to claim 1, characterised in that said sensor is mounted to said feeder means by non-ferromagnetic mounting means.

10. An agricultural harvesting machine according to claim 9, characterised in that said mounting means comprise at least one of non-ferromagnetic bolts and spacers.

* * * * *